US011735996B2

(12) United States Patent
Al-Areqi et al.

(10) Patent No.: US 11,735,996 B2
(45) Date of Patent: Aug. 22, 2023

(54) POWER CONVERTER ARRANGEMENT AND CONTROL METHOD THEREFOR

(71) Applicant: Siemens Energy Global GmbH & Co. KG, Munich (DE)

(72) Inventors: Sanad Al-Areqi, Erlangen (DE); Adnan Chaudhry, Erlangen (DE); Stefan Hammer, Erlangen (DE); Volker Hussennether, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/791,964

(22) PCT Filed: Jan. 9, 2020

(86) PCT No.: PCT/EP2020/050413
§ 371 (c)(1),
(2) Date: Jul. 11, 2022

(87) PCT Pub. No.: WO2021/139888
PCT Pub. Date: Jul. 15, 2021

(65) Prior Publication Data
US 2023/0048126 A1    Feb. 16, 2023

(51) Int. Cl.
*H02M 7/483* (2007.01)
*H02M 1/00* (2006.01)
*H02J 3/26* (2006.01)
*H02M 7/521* (2006.01)

(52) U.S. Cl.
CPC ............. *H02M 1/0095* (2021.05); *H02J 3/26* (2013.01); *H02M 1/0093* (2021.05); *H02M 7/4835* (2021.05); *H02M 7/521* (2013.01)

(58) Field of Classification Search
CPC ...... H02M 1/0095; H02M 1/02; H02M 1/042; H02M 1/045; H02M 1/081; H02M 1/082;
(Continued)

(56) References Cited

U.S. PATENT DOCUMENTS

2003/0026111 A1* 2/2003 Steimer ............... H02M 1/0095
 363/16
2014/0362618 A1* 12/2014 Hassan ................. H02M 7/483
 363/35
(Continued)

OTHER PUBLICATIONS

Z. Wu et al: "A Serially-Connected Compensator for Eliminating the Unbalanced Three-Phase Voltage Impact on Wind Turbine Generators", NREL is a national laboratory of the U.S. Department of Energy Office of Energy Efficiency & Renewable Energy Operated by the Alliance for Sustainable Energy, LLC, 2015 IEEE Power and Energy Society General Meeting, Jul. 30, 2015, XP055733937.
(Continued)

*Primary Examiner* — Nguyen Tran
(74) *Attorney, Agent, or Firm* — Laurence A. Greenberg; Werner H. Stemer; Ralph E. Locher

(57) ABSTRACT

A method controls a converter assembly which has a line-commutated converter. The line-commutated converter has an alternating voltage terminal which can be connected via a phase conductor to an alternating voltage network. The converter assembly further has a switch module branch which is arranged serially in the phase conductor and which contains a series circuit of switch modules at each of the terminals of which bipolar voltages can be generated which add up to a branch voltage. A connection voltage to a connection point between the switch module branch and the converter is controlled by adjusting an amplitude of a positive sequence component of the branch voltage. The converter assembly is configured to carry out a control method for controlling the converter assembly.

8 Claims, 4 Drawing Sheets

(58) Field of Classification Search
CPC .... H02M 1/0093; H02M 7/4835; H02M 7/49; H02M 7/483; H02M 7/4826; H02M 7/521; H02J 3/26
See application file for complete search history.

(56) References Cited

U.S. PATENT DOCUMENTS

2016/0126737 A1* 5/2016 Dijkhuizen ......... H02M 7/4835
 307/46
2020/0161960 A1* 5/2020 Mukunoki ............... G05F 1/70

OTHER PUBLICATIONS

Paulraj T. et al: "Voltage Unbalance Mitigation Using Positive Sequence Series Compensator", IOSR Journal of Electrical and Electronics Engineering, Jan. 1, 2014, pp. 98-103, XP055733930, DOI: 10.9790/1676-093198103.

M. Rane et al: "Mitigation of harmonics and unbalanced source voltage condition in standalone microgrid: positive sequence component and dynamic phasor based compensator with real-time approach", HELIYON, vol. 5, No. 2, Feb. 28, 2019, pp. e01178-28, XP055733919, ISSN: 2405-8440, DOI: 10.1016/j.heliyon.2019.e01178.

Bakas Panagiotis et al.: "Hybrid Topologies for Series and Shunt Compensation of the Line-Commutated Converter"; IEEE, 8th International Power Electronics and Motion Control Conference (IPEMC-ECCE Asia); 2016; May 22, 2016; pp. 3030-3035; XP032924766; 2016.

* cited by examiner

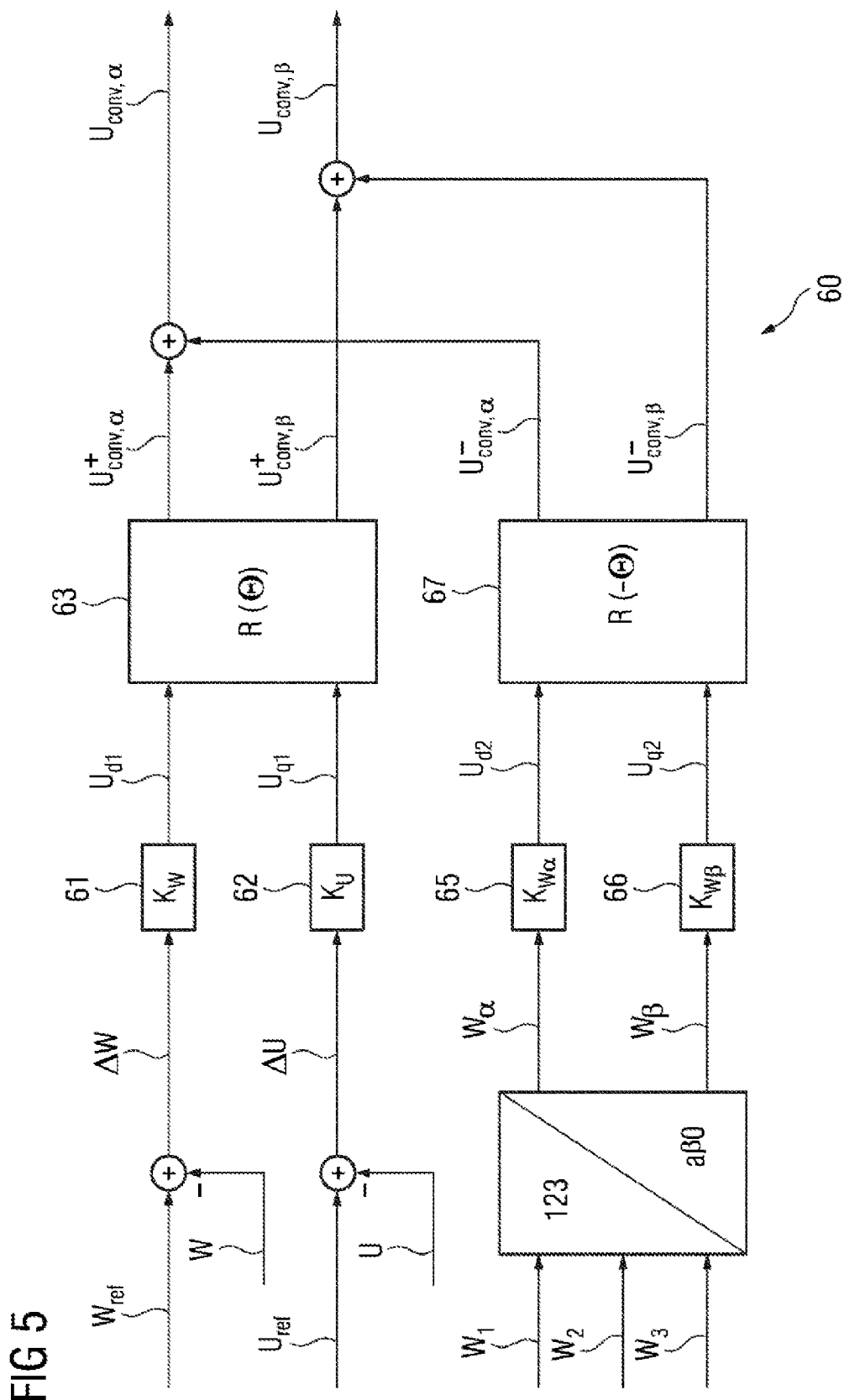

POWER CONVERTER ARRANGEMENT AND CONTROL METHOD THEREFOR

SPECIFICATION

Field and Background of the Invention

The invention relates to a control method for a power converter arrangement, which comprises a line-commutated power converter having an AC voltage terminal which is able to be connected, or during the operation of the power converter arrangement is connected, to an AC voltage grid via a phase line, wherein the power converter arrangement further comprises at least one switching module branch, which is arranged in series in the phase line and which comprises a series connection of switching modules, at each of whose terminals bipolar voltages which add up to produce a branch voltage are able to be generated. Line-commutated power converters are known from the prior art. They are distinguished, in particular, in that a changeover of the power converter valves (also referred to as commutation) is brought about by the connected AC voltage grid. The semiconductor switches used in the line-commutated power converter are often either passive elements, such as diodes, or semiconductor switches which can be turned on but not actively turned off, such as thyristors, for example. The advantage of line-commutated power converters is primarily their robustness, reliability, relatively easy handling and control and the option of designing line-commutated power converters for particularly high voltages.

Line-commutated power converters are used in some applications in association with a weak or unstable grid system. In such applications, the case may occur whereby an AC voltage (or voltage-time area) provided by the AC voltage grid is lower, due to transient processes, than that which is required for commutating the power converter. Such transient processes may be, for example, the switching of an AC voltage filter, the switching of a transformer tap changer or a change in the electric power drawn from the AC voltage grid (what is known as a voltage dip). This can lead to commutation faults and other disruptions during operation, or even to interruption of operation.

In order to improve voltage stability in the case of weak grid systems, it is possible to combine the line-commutated power converter with shunt compensation. In the case of very weak AC grid systems, there is also the possibility of using a rotating phase shifter.

An arrangement having a line-commutated power converter and a controllable series capacitance and also an associated control concept is known from the article by Bakas et al. "Hybrid Topologies for Series and Shunt Compensation of the Line-Commutated Converter", IEEE 2016. The series capacitance in this case is formed by full-bridge switching modules that are incorporated in series into a phase line. In the known arrangement, there is provision, in particular, for "passive" use of the full-bridge switching modules, these serving only to introduce a fundamental frequency voltage. Full-bridge switching modules are distinguished, in particular, in that a bipolar voltage, i.e. both a positive and a negative switching module voltage, is able to be generated at their terminals. The absolute value of the switching module voltage substantially corresponds to an energy storage unit voltage present on an energy storage unit of the full-bridge switching module. The controllable series capacitance can advantageously be used to compensate for a line impedance between the power converter and the linking point.

SUMMARY OF THE INVENTION

The object of the invention is to propose a method of this type that is as effective and reliable as possible.

The object is achieved with the method of this type, according to the invention, in that a link voltage at a linking point between the switching module branch and the power converter (which can also be referred to as a point of common coupling (PCC)) is controlled by adjusting (only) an amplitude of a positive-sequence system of the branch voltage. This means, in particular, that, during the control operation, the positive-sequence system of the branch voltage is ascertained by means of an appropriate control device and is subsequently processed further as appropriate. Breaking down the branch voltage into the positive-sequence system and also a negative-sequence system and a zero-sequence system is a control measure that is known to those skilled in the art. By controlling the output voltage based on only the positive-sequence system or the amplitude thereof, it is possible to decouple the voltage control from the energy control of the power converter arrangement and in particular of the switching module branch. This subsequently allows, according to the applicant's own investigations, the use of particularly reliable remaining control measures in accordance with an effective and customary control theory.

Accordingly, a branch energy of the switching module branch can be controlled by adjusting (only) a phase of the positive-sequence system of the branch voltage. Control of the branch energy means, in particular, that adjustment is carried out in such a way that the branch energy corresponds to a predefined setpoint value as far as possible. The branch energy in this case is that energy which is stored in the switching module branch at a given time. It substantially corresponds to the energy that is stored in the switching modules of the switching module branch. If a plurality of switching module branches are used, which together are referred to as a converter, the branch energy replaces the converter total energy.

Expediently, balancing of energy storage unit voltages of the switching modules is carried out by adjusting an amplitude and a phase of a negative-sequence system of the branch voltage. To this end, the switching modules each suitably have an energy storage unit, such that a voltage that is able to be generated at the terminals of the switching module substantially corresponds, in terms of absolute value, to the energy storage unit voltage. The object of balancing the energy storage unit voltages is to keep the energy storage unit voltages of all of the switching modules used at the same level relative to each other. Over time, different energy storage unit voltages or differences between the energy storage unit voltages of the switching modules of the switching module branch lead to varyingly high levels of load on the switching modules, which can bring about a reduction in the operability of the whole arrangement.

According to one embodiment of the invention, the power converter arrangement has a respective switching module branch for each phase of the AC voltage grid, the adjustments being carried out for all switching module branches. In particular in the case of a three-phase AC voltage grid, the line-commutated power converter is suitably in three-phase form. A second switching module branch is arranged in series between a second AC voltage terminal of the power converter and a linking point to a second phase line of the AC voltage grid. A third switching module branch is arranged in series between a third AC voltage terminal of the power converter and a linking point to a third phase line of the AC voltage grid. The switching modules may, but need not necessarily, be of identical design. Each switching module branch expediently comprises its own series connection of the switching modules. In this type of control operation, the energy control has the aim, in particular, of keeping the energy for all switching module branches the same so that different loads do not occur on the switching module branches. Balancing is carried out individually for each switching module branch so that the switching modules associated with the respective switching module branch (in any case on average over time) have energy storage unit voltages that are as identical as possible.

Expediently, a voltage setpoint value for the branch voltage is generated, which value consists of a positive-sequence system setpoint value and a negative-sequence system setpoint value, wherein the positive-sequence system setpoint value is generated in consideration of a total energy setpoint value and a link voltage setpoint value, and the negative-sequence system setpoint value is generated in consideration of switching module branch energies. In some circumstances, it may be useful in this case to transform the processed variables into a suitable reference frame. This can be done, for example, by means of a Clarke transformation.

Suitably, the voltage setpoint value of the output voltage is chosen in such a way that a line impedance of the AC voltage grid is compensated for. In this way, a line impedance present between the power converter and the PCC, for example, can be compensated for. In particular, an additional voltage can be injected into the grid here by means of the switching module branch, i.e. such that a power-converter-side voltage at the switching module branch is smaller than a grid-side voltage at the switching module branch. The injected voltage can be, for example, an AC voltage with a frequency that corresponds to the rated frequency of the AC voltage grid.

It is considered to be advantageous if an AC-voltage-side current is used as a reference variable for determining the positive-sequence system. The AC-voltage-side current thus forms the reference variable to which the positive-sequence system and the negative-sequence system of the voltage refer. The AC-voltage-side current is that current which flows through the switching module branch or branches.

The invention further relates to a power converter arrangement, which comprises a line-commutated power converter which has an AC voltage terminal which is able to be connected to an AC voltage grid via a phase line, wherein the power converter arrangement further comprises a switching module branch, which is arranged in series in the phase line and which comprises a series connection of switching modules, at each of whose terminals bipolar voltages which add up to produce a branch voltage are able to be generated, the power converter arrangement further comprising a control device for controlling a link voltage.

Such a power converter arrangement is known from the article by Bakas et al. already mentioned above.

The object of the invention is to specify a power converter arrangement that can be operated as effectively and reliably as possible.

The object is achieved with a power converter arrangement of this type, according to the invention, in that the power converter arrangement is configured to carry out the method according to the invention by means of the control device.

The advantages of the power converter arrangement according to the invention result, in particular, from the above-described advantages of the method according to the invention.

According to one embodiment of the invention, the line-commutated power converter is a thyristor-based power converter, which has a three-phase bridge circuit with six phase branches. Each phase branch thus extends between one of the DC voltage poles of the power converter and one of the AC voltage terminals. A series connection of thyristors is arranged in each phase branch. The number of thyristors in a phase branch is determined by the desired design of the power converter.

In particular, the power converter arrangement can be designed for a voltage of more than 100 kV, preferably of more than 500 kV.

The invention will be explained in more detail below on the basis of FIGS. 1 to 5.

BRIEF DESCRIPTION OF THE FIGURES

FIG. 5 shows a schematic representation of a flow diagram of an exemplary embodiment of a method according to the invention.

DETAILED DESCRIPTION OF THE INVENTION

Figure 1:
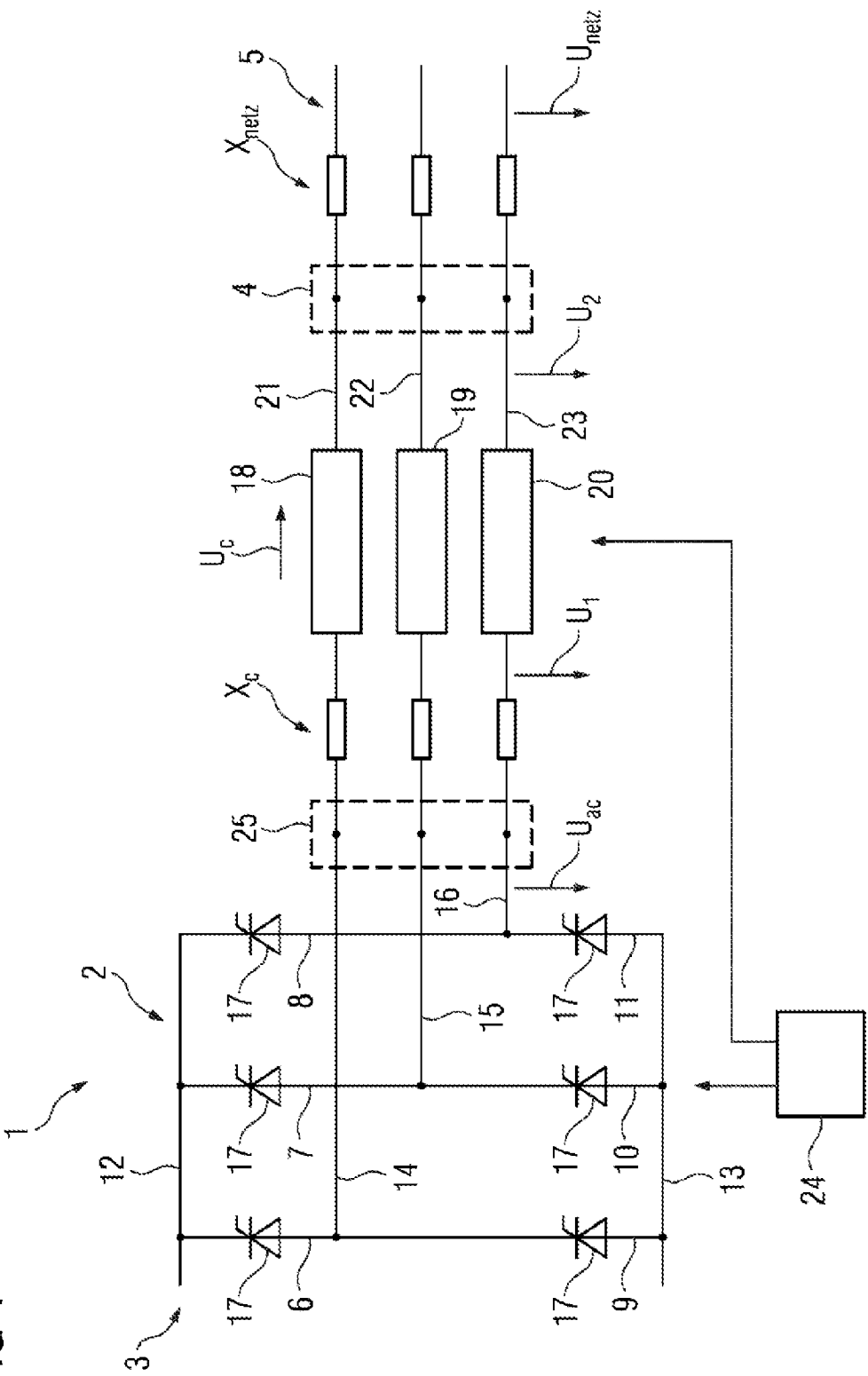
FIG. 1 shows a schematic representation of an exemplary embodiment of a power converter arrangement according to the invention.

FIG. 1 shows a power converter arrangement 1, which is connected, at a grid connection point 4, to a three-phase AC voltage grid 5. The power converter arrangement 1 comprises a line-commutated power converter 2. The power converter 2 is arranged between a DC voltage grid or DC voltage line 3 and a linking point 25. The power converter 2 comprises six power converter arms or power converter valves 6-11, which each extend between one of the DC voltage poles 12 or 13 of the power converter 2 and one of the three AC voltage terminals 14-16. A series connection of thyristors 17 is arranged in each of the power converter arms 6-11. The power converter 2 is connected to the AC voltage grid 5 by means of the AC voltage terminals 14-16 via three phase lines 21-23.

The power converter arrangement 1 further comprises a first switching module branch 18, a second switching module branch 19 and a third switching module branch 20. The first switching module branch 18 is introduced in series into a first phase line 21, the second switching module branch 19 is introduced in series into a second phase line 22 and the third switching module branch 20 is introduced in series into a third phase line 23. In the example shown in FIG. 1, the three switching module branches 18-20 are of identical design, but this does not generally have to be the case. The design of the switching module branches 18-20 is discussed in more detail in FIG. 2 below.

A voltage dropped across the switching branches 18-20 is denoted Uc. The power-converter-side line-to-ground voltage is denoted U1, and the grid-side line-to-ground voltage is accordingly denoted U2. The switching module branches 18-20 are used to compensate for a line impedance Xnetz and/or a converter-side impedance Xc and to stabilize a link voltage Uac at the linking point 25 in order to guarantee stable and reliable operation of the power converter arrangement 1, and in particular of the power converter 2. For this purpose, the power converter arrangement 1 has a central control unit 24, which is configured both to control the power converter 2, or to initiate the actuation of the semiconductor switches, and to control the switching module branches, or to initiate the actuation of the semiconductor switches used there.

Figure 2:
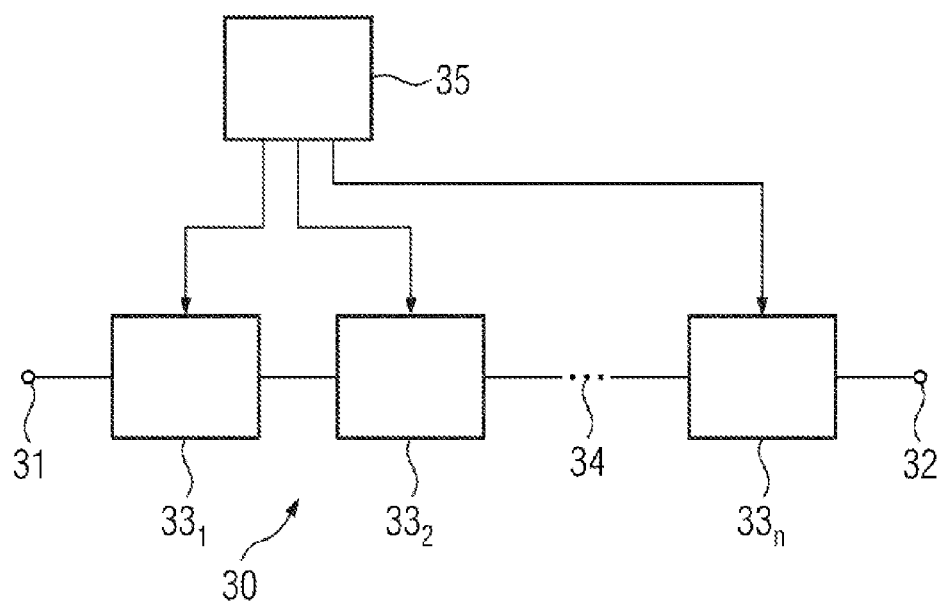
FIG. 2 shows a schematic representation of an exemplary embodiment of a switching module branch for a power converter arrangement according to the invention.

FIG. 2 shows a switching module branch 30, which is suitable for use as one of the switching module branches 18-20 of the power converter arrangement 1 of FIG. 1. The switching module branch 30 has a first terminal 31 and a second terminal 32 for switching into a phase line of an AC voltage grid. Between the two terminals 31, 32 is arranged a series connection of switching modules 331-33n, the number of which is in principle arbitrary and can be tailored to the particular application, indicated by a dotted line 34 in FIG. 2. The design of the switching modules 331-33n is discussed in more detail in FIG. 3 below. It goes without saying here that not all of the switching modules 331-33n have to be of identical design.

An actuation unit 35 is provided to carry out or to initiate the actuation of the switching modules 331-33n. The actuation unit 35 is provided with communication means which allow, for example, communication with a superordinate central open-loop or closed-loop control unit of a power converter arrangement.

Figure 3:
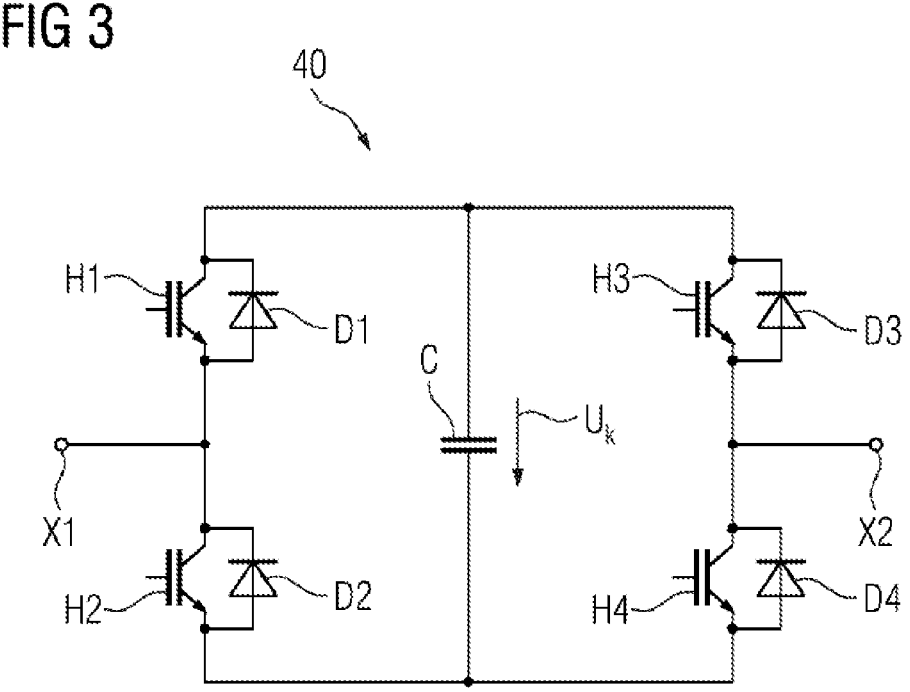
FIG. 3 shows a schematic representation of a full-bridge switching module.

FIG. 3 shows an example of a switching module 40 for the switching branch 30 of FIG. 2, the switching module 40 being a full-bridge switching module. The switching module 40 comprises a first turn-off semiconductor switch H1, with which a first freewheeling diode D1 is connected in antiparallel, and a second turn-off semiconductor switch H2, with which a second freewheeling diode D2 is connected in antiparallel, wherein the first and second semiconductor switches H1, H2 are connected to each other in a first semiconductor series connection and have the same forward direction. The switching module 40 further comprises a third turn-off semiconductor switch H3, with which a third freewheeling diode D3 is connected in antiparallel, and a fourth turn-off semiconductor switch H4, with which a fourth freewheeling diode D4 is connected in antiparallel, wherein the third and fourth semiconductor switches H3, H4 are connected to each other in a second semiconductor series connection and have the same forward direction. The two semiconductor series connections are arranged in parallel with each other and with an energy storage unit C, on which an energy storage unit voltage Uk is present. Furthermore, the switching module further comprises a first connection terminal X1, which is arranged between the semiconductor switches H1, H2 of the first semiconductor series connection, and a second connection terminal X2, which is arranged between the semiconductor switches H3, H4 of the second semiconductor series connection. The semiconductor switches H1-4 are able to be actuated, i.e. are able to be turned on and/or turned off, independently of each other by means of a suitable actuation unit. Suitable actuation of the semiconductor switches H1-4 can be used to generate a voltage (switching module voltage) at the terminals X1,2, which voltage corresponds to the voltage Uk present on the energy storage unit C, a voltage −Uk or a zero voltage.

Figure 4:
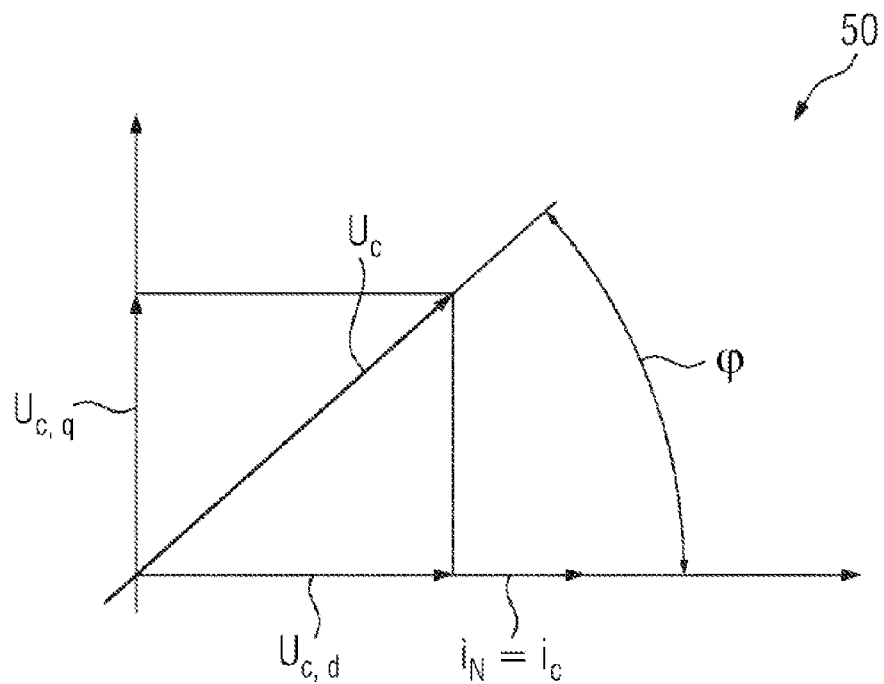
FIG. 4 shows a schematic representation of a vector diagram for branch current and branch voltage of a switching module branch.

FIG. 4 shows a vector diagram 50. The vector diagram 50 illustrates that the reference frame of the branch current ic is chosen for controlling the branch voltage Uc. In this case, the branch current ic through the switching module branch or branches corresponds to the line current iN. The vector of the branch voltage Uc has a phase angle phi in relation to the branch current ic and can thus be broken down into a d component Uc,d parallel to the branch current ic and a q component Uc,q perpendicular to the branch current ic. These two components are used for the voltage or energy control.

A schematic flow diagram 60 of an example of the control sequence is shown in FIG. 5. In this instance, control is based on the case of a three-phase embodiment of the power converter arrangement, wherein a first switching module branch is arranged in a first phase line, a second switching module branch is arranged in a second phase line and a third switching module branch is arranged in a third phase line, in a similar manner to the arrangement shown in FIG. 1. The three switching module branches together are referred to as a converter below.

According to the example shown in FIG. 5, a setpoint value Wref for the converter total energy is compared with a measured value W of the converter total energy, forming an energy difference DeltaW. The energy difference DeltaW is delivered to a first controller 61. The output of the first controller 61 provides a first d component Ud1 of the voltage in the reference frame of the branch current ic. At the same time, a setpoint value Uref for the link voltage at a linking point between the power converter and the switching module branches is compared with a measured value U of the link voltage, forming a voltage difference DeltaU. The energy difference DeltaU is delivered to a second controller 62. The output of the second controller 62 provides a first q component Uq1 of the voltage in the reference frame of the branch current ic. The d component Ud1 and the q component Uq1 are transformed by means of a rotational transformation in a rotational transformation block 63 with a rotation matrix R(Theta)=(cos(Theta),−sin(Theta)/sin(Theta), cos(Theta)), wherein Theta denotes a normalization angle of the current reference frame, and are therefore converted into a first positive-sequence system component Uconv,alpha+ of the alpha component Uconv,alpha of the voltage that is to be set at the converter and a second positive-sequence system component Uconv,beta+ of the beta component Uconv,beta of the voltage that is to be set at the converter.

A first, second and third branch energy value W1,W2,W3 are delivered to a transformation block 64 and transformed, by means of a Clarke transformation, into corresponding alpha and beta components Walpha and Wbeta. These are delivered to a third controller 65 and a fourth controller 66, respectively, the outputs of which provide a second d component Ud2 and a second q component Uq2 of the voltage in the reference frame of the branch current ic. The second d component Ud2 and the second q component Uq2 are transformed by means of a rotational transformation in a second rotational transformation block 67 with a rotation matrix R(Theta)=(cos(Theta), sin(Theta)/−sin(Theta), cos(Theta)) and are therefore converted into a first negative-sequence system component Uconv,alpha− of the alpha component Uconv,alpha of the voltage that is to be set at the converter and a second negative-sequence system component Uconv,beta− of the beta component Uconv,beta of the voltage that is to be set at the converter.

The voltage that is to be set at the converter thus consists of Uconv,alpha=Uconv,alpha++Uconv,alpha− and Uconv,beta=Uconv,beta++Uconv,beta−.

The invention claimed is:

1. A control method for a power converter configuration having a line-commutated power converter with an AC voltage terminal configured for connecting to an AC voltage grid via a phase line, the power converter configuration further containing a main switching module branch disposed in series in the phase line and having a series connection of switching modules, the switching modules having terminals and at each of the terminals, bipolar voltages are generated and add up to produce a branch voltage, wherein the main switching module branch having a respective switching module subbranch for each phase of the AC voltage grid and adjustments being carried out for all switching module subbranches, the method comprises the steps of:

controlling a link voltage at a linking point between the switching module branch and the line-commutated power converter by adjusting an amplitude of a positive-sequence system of the branch voltage; and generating a voltage setpoint value for the branch voltage, the voltage setpoint value is formed of a positive-sequence system setpoint value and a negative-sequence system setpoint value, wherein the positive-sequence system setpoint value is generated in consideration of a total energy setpoint value and a link voltage setpoint value, and the negative-sequence system setpoint value is generated in consideration of switching module branch energies.

2. The method according to claim 1, which further comprises controlling a branch energy of the switching module branch by adjusting a phase of the positive-sequence system of the branch voltage.

3. The method according to claim 2, which further comprises carrying out a balancing of energy storage unit voltages of the switching modules by adjusting an amplitude and a phase of a negative-sequence system of the branch voltage.

4. The method according to claim 1, which further comprises using the method to compensate for a line impedance of the AC voltage grid.

5. The method according to claim 1, which further comprises using an AC-voltage-side current as a reference variable for determining the positive-sequence system.

6. A power converter configuration, comprising:
a line-commutated power converter having an AC voltage terminal configured for connecting to an AC voltage grid via a phase line;
a main switching module branch disposed in series in the phase line and having a series connection of switching modules, said switching modules having terminals and at each of said terminals, bipolar voltages which add up to produce a branch voltage are generated; and
a controller for controlling a link voltage, the power converter configuration configured to carry out the method according to claim 1 by means of said controller.

7. The power converter configuration according to claim 6, wherein said line-commutated power converter is a thyristor-based power converter which has a three-phase bridge circuit with six phase branches.

8. The power converter configuration according to claim 6,
wherein the power converter configuration is configured for a voltage of more than 100 kV.

* * * * *